United States Patent
Lumsdaine et al.

(10) Patent No.: US 9,767,580 B2
(45) Date of Patent: Sep. 19, 2017

(54) APPARATUSES, METHODS, AND SYSTEMS FOR 2-DIMENSIONAL AND 3-DIMENSIONAL RENDERING AND DISPLAY OF PLENOPTIC IMAGES

(71) Applicant: Indiana University Research and Technology Corporation, Indianapolis, IN (US)

(72) Inventors: Andrew Lumsdaine, Bloomington, IN (US); Tod J. Curtis, Bedford, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 609 days.

(21) Appl. No.: 14/286,172

(22) Filed: May 23, 2014

(65) Prior Publication Data
US 2014/0347352 A1 Nov. 27, 2014

Related U.S. Application Data

(60) Provisional application No. 61/826,633, filed on May 23, 2013.

(51) Int. Cl.
*H04N 13/00* (2006.01)
*G06T 11/00* (2006.01)
(Continued)

(52) U.S. Cl.
CPC ............ *G06T 11/001* (2013.01); *G06T 7/557* (2017.01); *G06T 19/00* (2013.01);
(Continued)

(58) Field of Classification Search
CPC ... G06T 11/001; G06T 19/00; G06T 2200/21; G06T 7/557; H04N 13/0018; H04N 13/0402; H04N 13/0468; H04N 13/0497
See application file for complete search history.

(56) References Cited

U.S. PATENT DOCUMENTS 6,819,972 B1 * 11/2004 Martin ............... D06B 11/0096
219/121.68
6,903,738 B2 6/2005 Pfister et al.
(Continued)

OTHER PUBLICATIONS

Adelson, T., and Wang, J.Y.A. 1992. "Single Lens Stereo With a Plenoptic Camera", IEEE Transactions on Pattern and Machine Intelligece 14, Feb. 2, pp. 99-106.
(Continued)

*Primary Examiner* — Siamak Harandi
(74) *Attorney, Agent, or Firm* — Faegre Baker Daniels LLP (57) ABSTRACT

Apparatuses, methods and systems for processing, rendering and displaying plenoptic images are disclosed. One exemplary embodiment is a method comprising storing a plenoptic image in a non-transitory computer readable memory associated with a processor, receiving at the processor a viewing position information, processing the plenoptic image and the viewing position information to render a visual output based upon information of the plenoptic image and the viewing position information, performing a blending or smoothing function on information of the plenoptic image including weighting each of a plurality of pixels of the plenoptic image based upon a first color value associated with each pixel and a set of second color values associated with a plurality of neighboring pixels, and displaying the visual output on a display device. The visual output displayed on the display device varies as a function of the viewing position information.

20 Claims, 6 Drawing Sheets
(2 of 6 Drawing Sheet(s) Filed in Color)

(51) Int. Cl.
G06T 7/557 (2017.01)
G06T 19/00 (2011.01)
H04N 13/04 (2006.01)

(52) U.S. Cl.
CPC ..... *H04N 13/0018* (2013.01); *H04N 13/0402* (2013.01); *H04N 13/0468* (2013.01); *H04N 13/0497* (2013.01); *G06T 2200/21* (2013.01)

(56) References Cited

U.S. PATENT DOCUMENTS

| | | | |
|---|---|---|---|
| 2011/0175903 A1 | 7/2011 | Munro et al. | |
| 2011/0273466 A1 | 11/2011 | Imai et al. | |
| 2012/0212509 A1* | 8/2012 | Benko | G03B 35/00 345/633 |
| 2012/0249550 A1* | 10/2012 | Akeley | H04N 5/232 345/419 |
| 2012/0299817 A1 | 11/2012 | Atkins et al. | |

OTHER PUBLICATIONS

Ives, H.E., "Parallax Panoramagrams Made With a Large Diameter Lens", J. opt. Soc. Amer, 20, 1930, pp. 332-342.

Lippman, G, "La Photographie Integrale", Computes-Rendus, Academie des Sciences, 146, 1908, pp. 446-551.

Lumsdaine, A. Georgiev, T., "The Focused Plenoptic Camera", In Proceedings of the International Conference on Photgraphys, 2009, pp. 1-8.

Ng, R, "Fourier Slice Photography", In ACM Transactions on Graphics, Jul. 2005, pp. 735-744.

Ng, R., Levoy, M., Gredief, M., Duval, G., Horowitz, M., and Hanrahan, P., "Light Field Photography With a Hand-Held Plenoptic Camera", Tech Rep., CSTR Feb. 2005, Stanford Computer Science, also available at http://graphics.standord.edu/papers/lfcamera., pp. 1-11.

* cited by examiner

APPARATUSES, METHODS, AND SYSTEMS FOR 2-DIMENSIONAL AND 3-DIMENSIONAL RENDERING AND DISPLAY OF PLENOPTIC IMAGES

RELATED APPLICATIONS

The present application claims the benefit of U.S. Application No. 61/826,633, filed May 23, 2013, the disclosure of which is hereby incorporated by reference including, without limitation, the Reservation of Copyright Rights Under 37 CFR 1.71.

BACKGROUND

Plenoptic imaging, sometimes referred to as lightfield imaging or integral imaging, represents an advance over traditional photography. Plenoptic cameras see things in ways that even high resolution conventional cameras or the human eye cannot. For example, exemplary plenoptic cameras may be utilized to capture the entire light field of a scene being photographed or substantially the entire light field of the scene which is detectable given the functionality of the camera instrumentation and associated components utilized. There remain significant technical challenges and unmet needs with respect to apparatuses, methods, and systems for processing, rendering, and displaying visual output based upon plenoptic images. Plenoptic images require complex and specialized processing to properly reconstruct a scene and produce desired visual output. The creation of multiple images on a single sensor can reduce the resolution of each individual microimage significantly further compounding the processing challenges. Furthermore, plenoptic images are open to many methods of interpretation which may be difficult for the viewer to assess. In light of these and a variety of other shortcomings and unmet needs in the field, there remains a substantial need for the unique apparatuses, systems and methods disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

SUMMARY

Plenoptic images (sometimes referred to as a lightfield images or an integral images) contain a wealth of data not available in a conventional photographic image and preferably contain the entire or substantially the entire light-field of a scene. The unique apparatuses, methods and systems disclosed herein provide techniques for processing, rendering and displaying visual output based upon one or more plenoptic images. Further embodiments, forms, objects, features, advantages, aspects, and benefits shall become apparent from the following description and figures.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Exemplary apparatuses, methods and systems shall now be described in detail. As shall become apparent in the following description, certain embodiments allow users to reconstruct visual output based upon plenoptic images, manipulate the point of view in both the horizontal and vertical dimensions, change the plane of focus, and perform basic operations such as loading plenoptic images and saving the manipulated image in a common format. Certain embodiments allow the user to view the image stereoscopically, with the ability to widen or narrow the offset between viewpoints. Certain embodiments comprise a head-tracking systems that determine the position of a viewer's head, face, and/or eyes, and adjusts the viewpoint of the scene based on a determined position. In this way the user can manipulate the view of the scene solely by adjusting head position. When viewing images stereoscopically, the head tracking mechanism can be used to provide an additional layer of realism.

Certain embodiments comprise techniques which manipulate data contained in a plenoptic image, merging selected portions of the original image into a new image that represents the viewpoint and focal plane desired by the user. In certain embodiments, stereoscopic views are created by the same manipulation on the original image, carried out twice from separate viewpoints, and then overlaid or combined in a manner that facilitates stereoscopic viewing. The head-tracking mechanism may utilize a video camera (e.g., a webcam, or small USB video capture device) to capture a continuous view of the user. Software algorithms, including cascades to identify Haar-like features are performed to identify the viewer's face and eye position. The view from the camera is visible to the user on screen, and a red dot may be generated and displayed between the eyes to indicate correct tracking. As the user moves, the scene is recalculated from the new viewpoint, as if the user were looking at the scene through a window (in this case a monitor).

Some embodiments render and display stereoscopic three dimensional (3D) visual output. Some embodiments render and display visual output which varies as a function of a viewer's position, such as head position or eye position. Some exemplary embodiments include the ability to refocus at any particular focal point in the image or at a plurality of focal points in the image. Certain embodiments provide the ability to view the scene from more than one viewpoint, which can result in the creation of stereoscopic images from a single plenoptic image. Some embodiments include the ability to create a depth map of the scene and produce matted images. Some embodiments include the ability to create custom HDR (high dynamic range) images. Some embodiments include combinations of the foregoing and/or other plenoptic image rendering and display capabilities. Some embodiments include the ability to produce superresolution images from the data. In some embodiments the images are open to many methods of interpretation, which allows for greater assessment of a scene.

Figure 1:
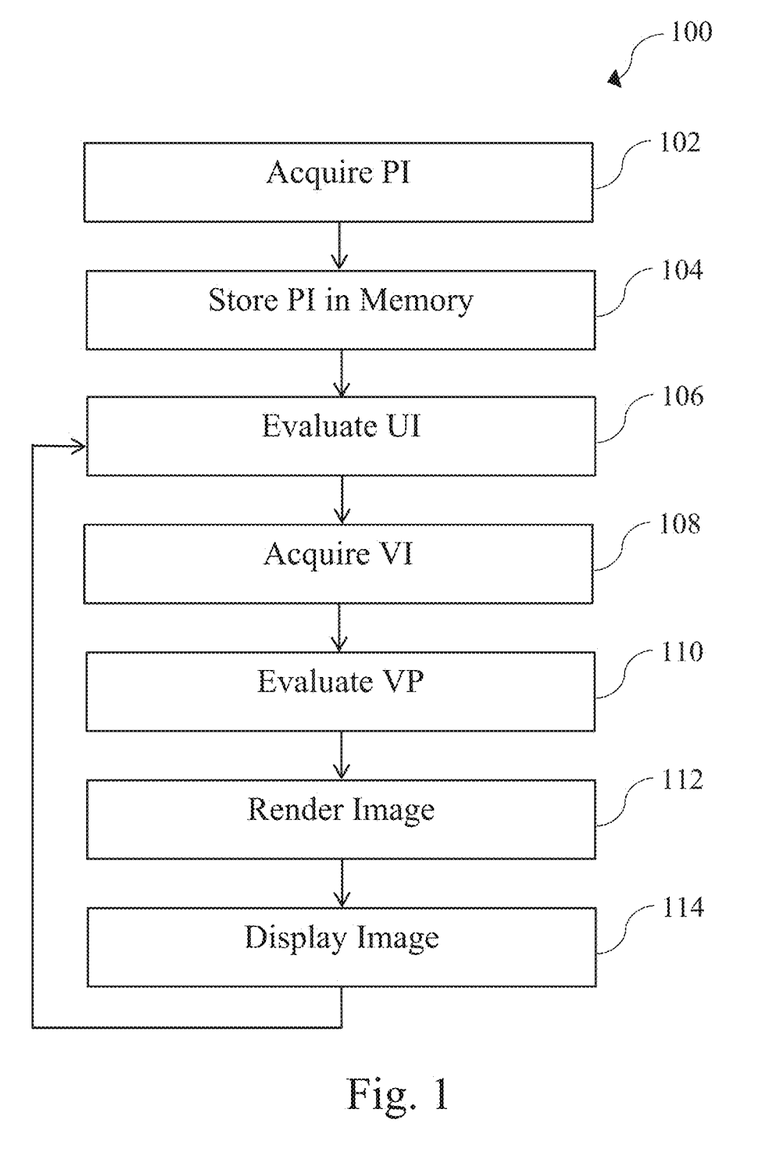
FIG. 1 illustrates a flow diagram according to an exemplary process for processing, rendering, and displaying visual output based upon a plenoptic image.

With reference to FIG. 1 there is illustrated a flow diagram according to an exemplary process for processing, rendering and displaying a visual output based upon a plenoptic image input to a display system. Process 100 starts at operation 102 where a plenoptic image (PI) is acquired. Acquisition of a plenoptic image may be performed with one or more plenoptic cameras, sometimes referred to as lightfield cameras which utilize microlens arrays to capture four-dimensional (4D) light field information with one or more electronic image sensors such as a CMOS, CCD or other semiconductor-based electronic image sensor.

From operation 102 process 100 proceeds to operation 104 where the acquired plenoptic image is input and stored in one or more non-transitory computer-readable memory devices provided in or associated with a processing unit. From operation 104 process 100 proceeds to operation 106 which evaluates a user input (UI) which may include one or more of a number of commands including, for example, focus, zoom, direction, image selection, and image capture commands.

From operation 106 process 100 proceeds to operation 108 where an image of a viewer is acquired. From operation 108 process 100 proceeds to operation 110 where the position of the viewer in the image of the viewer is evaluated. In certain embodiments video images from a digital camera, such as a USB camera, may be utilized to provide a continuous, periodic, or on command feedback of a viewer's head position using a tracking routine. An exemplary head tracking routine comprises the following operations:

a) capture an image from the camera,
b) modify the image qualities to enhance detection,
c) use an xml cascade to search for a face,
d) calculate the position of the face in x and y coordinates and update the viewpoint for the rendering routine,
e) draw a red dot on the image between the eyes, and
f) update the image in the live view on the display.

It shall be appreciated that certain embodiments comprise alternate head tracking routines which may omit one or more of the foregoing operations and include one or more additional or alternate operations. It shall further be appreciated that some embodiments may omit the foregoing tracking functionality and may rely upon positional information provided by a transmitter, a telemetry system, or upon user input from a device such as a keyboard, touch screen, mouse, joystick or video game controller to name but a few exemplary user inputs.

From operation 110 process 100 proceeds to operation 112 where a processing unit renders one or more images based upon the stored plenoptic image, the viewer position information, and/or the user input. From operation 112 process 100 proceeds to operation 114 where the processing unit displays the image to the viewer. From operation 114 process 100 proceeds to operation 106 and the foregoing operations may be repeated.

It shall be appreciated that further exemplary processes comprising a number of additional and/or alternate operations may be utilized in various embodiments. Certain embodiments render a plurality of potential visual outputs, for example, all available visual outputs or a subset thereof may be generated or rendered prior to any viewpoint evaluation and the viewpoint may then be adjusted by selecting the appropriate generated or rendered visual output.

The rendering performed at operation 112 or in other rendering operations may comprise a number of different operations and combinations of operations examples of which will now be described. Certain exemplary rendering techniques comprise pinhole rendering of plenoptic images. Pinhole rendering involves picking the same location (e.g., the same x, y coordinates) on each microimage in a plenoptic image and building a larger image from the image data at each pinhole location. This effectively creates an image with height and width corresponding to the number of microimages in each dimension.

Figure 3:
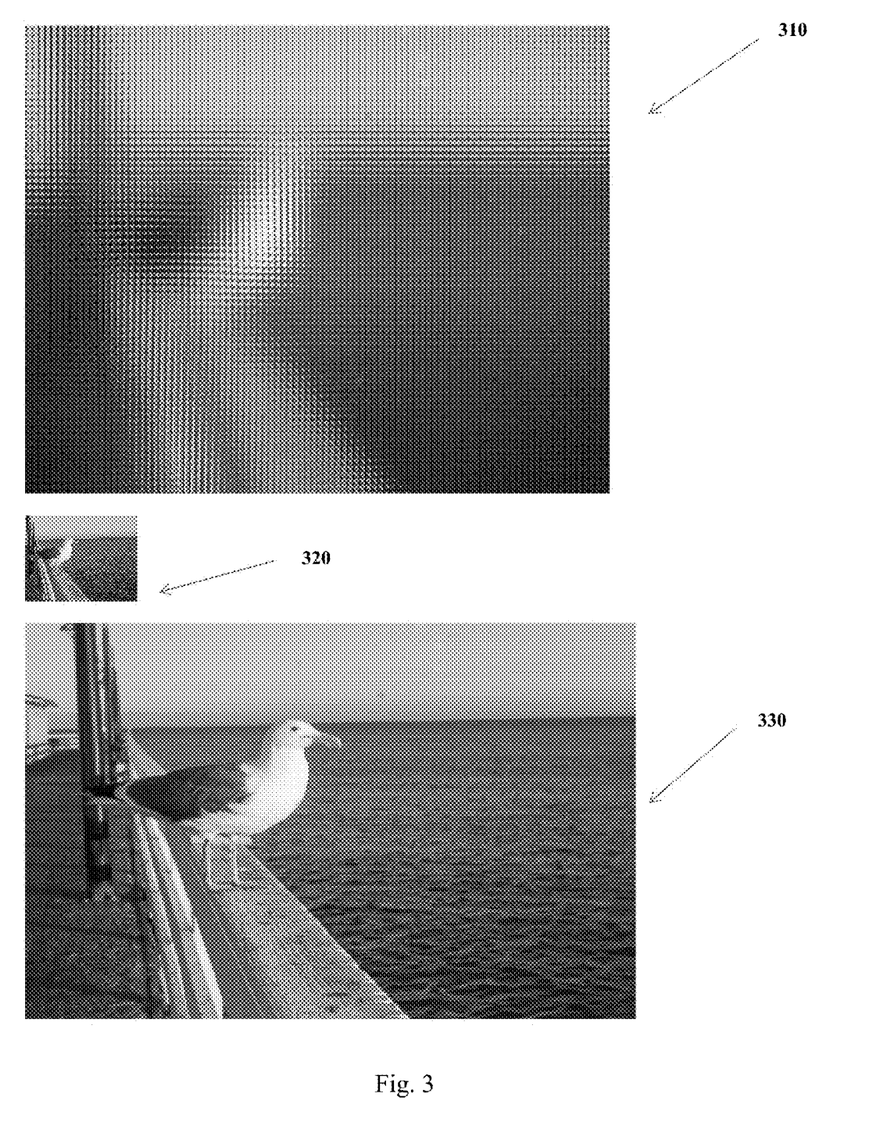
FIG. 3 illustrates an exemplary plenoptic image of a seagull scene and two exemplary visual outputs based upon the plenoptic image and two exemplary processing techniques.

Referring now to FIG. 3, a plenoptic image 310 of a seagull scene 310 includes a 97×73 array of microimages and an overall resolution of 7240×5233 pixels. A single pixel pinhole rendering operation may be performed using plenoptic image 310 to produce visual output 320 which is a 97×73 pixel image. The exemplary pinhole rendering technique used to produce visual output 320 comprises loading plenoptic image 310 into memory as a bitmap object for a processing unit to render an image of the seagull scene given a set of x,y coordinates, or a viewpoint. In order to render visual output 320, the following information was utilized: the number of microimages in each direction, the pixel dimensions of each microimage, the location of the origin (i.e., at the coordinates where the first complete microimage starts). The origin coordinates were utilized to account for the possibility that the plenoptic image captures only portions of microimages at the edges and to ignore incomplete microimages by offsetting a small amount in each dimension before reading the data. Another option for avoiding incomplete microimages is to crop the plenoptic image.

Certain exemplary rendering techniques utilize more than one pixel from each microimage in order to increase the total number of pixels in the visual output. In certain embodiments 2×2 patch sizes are utilized. In such embodiments the orientation of the pixel patch size relative to the final image is preferably taken into account, for example by recognizing that the micro images of certain plenoptic images are inverted. Certain embodiments utilize patches of other shapes and sizes and it shall be appreciated that patches of any arbitrary size and shape may be utilized. In certain embodiments, larger patch sizes are utilized. Variation in patch size can be utilized to vary the focal depth in a plenoptic image. Smaller patch sizes focus in the distance, and larger patch sizes focus closer to the camera. With further reference to FIG. 3, visual output 330 is based upon an 8×8 patch size of plenoptic image 310. At this patch size, the seagull is in focus at a 970×730 pixel dimension.

Variation in patch size and x, y coordinates may be utilized to provide the ability for a user to control both depth of focus and viewpoint. Such control may be provided based upon commands provided actively by a user input device, passively by photographing a viewer and evaluating viewing position, or through various combinations of these and other techniques.

Certain exemplary rendering techniques enhance computation and processing of plenoptic images by utilizing a four-dimensional (4-D) data array comprising arrays for a lens x, lens y, microimage pixel x, and microimage pixel y. Upon loading a plenoptic image into memory, bitmap object information can be arranged in this array structure. A four-dimensional array offers benefits for rendering operations because the y dimension can be inverted for each microimage at the time of placement into the array and also because the four-dimensional array structure offers advantages for processing and manipulation. While the use of the four-dimensional data array provide a number of performance enhancements, certain tradeoffs relating to conversion processing time and the use of share functions may dictate that such an array structure when used should be converted back to direct bitmap manipulation at the final processing rendering and display steps.

Certain exemplary rendering techniques offer the ability to perform a variety of complex image manipulation operations. Certain exemplary complex manipulation techniques comprises a smoothing or blending function which comprise the following operations. For each Pixel N within a fixed distance from the edge of each patch with a microimage:
  a) weight the Pixel N at a fixed amount to favor its original color;
  b) for each pixel neighboring the pixel N in each direction including diagonals:
    i. determine the color of the pixel on the adjacent side/corner at an appropriate distance inside the patch, and
    ii. add that color to our original color;
  c) when all neighbors have been evaluated, divide the total color by the number of pixels used for blending, including the weighted amount from the original to determine a new color; and
  d) change the color of Pixel N to the new color.

It shall be appreciated that the foregoing operations and those described elsewhere herein may be implemented in a variety of languages using a number of different techniques and structures.

Figure 4:
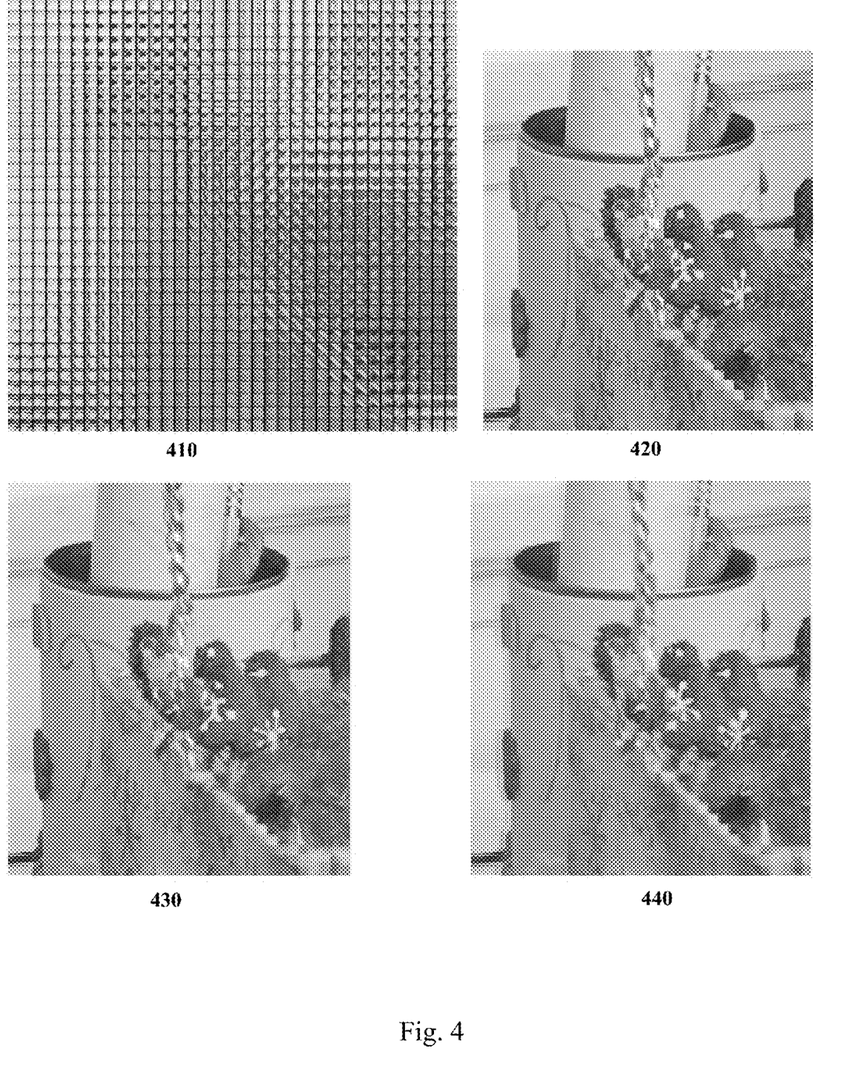
FIG. 4 illustrates an exemplary plenoptic image of a can scene and three exemplary visual outputs based upon the plenoptic image and another exemplary processing techniques.

With reference to FIG. 4 there is illustrated a plenoptic image 410 and a first visual output 420, a second visual output 430, and a third visual output 440. Visual output 420 was generated with an 8×8 patch size without use of a blending or smoothing function. As can be seen in FIG. 4, the object in the background of visual output 420 (a can) is in focus, but the foreground objects are blocky.

Visual output 430 was generated using an 8×8 patch size in combination with the aforementioned bending or smoothing technique. As shown in FIG. 4, the blending or smoothing technique has effectively blurred the foreground objects to provide a more natural overall picture. The amount of blending can be increased or decreased by changing the weighting of the original pixel and the distance into each pixel that is blended. With an appropriate depth bitmap the correct patch size can be applied to any particular section of the image and the need for significant blending may be greatly reduced.

Certain exemplary rendering techniques comprise creating a three-dimensional or stereoscopic image from a plenoptic image. In general this involves creating two distinct viewpoints, a left-eye viewpoint and a right-eye viewpoint, which are offset by some number of microimages. These offset viewpoints can be displayed in a flipbook like fashion (right-left, right-left, etc.) or combined into a single anaglyph (red-blue) image. The algorithm to create these viewpoints comprises feeding the separate viewpoints into the rendering routine and collecting the two views. In certain exemplary embodiments, the anaglyph comprises the following operation:
  a) rendering a left-eye viewpoint and a right-eye viewpoint, and
  b) for each pixel in the rendered image:
    i. taking the red value of the pixel color from the left-eye image, and
    ii. changing the red value of the right-eye image to that value.

Figure 5:
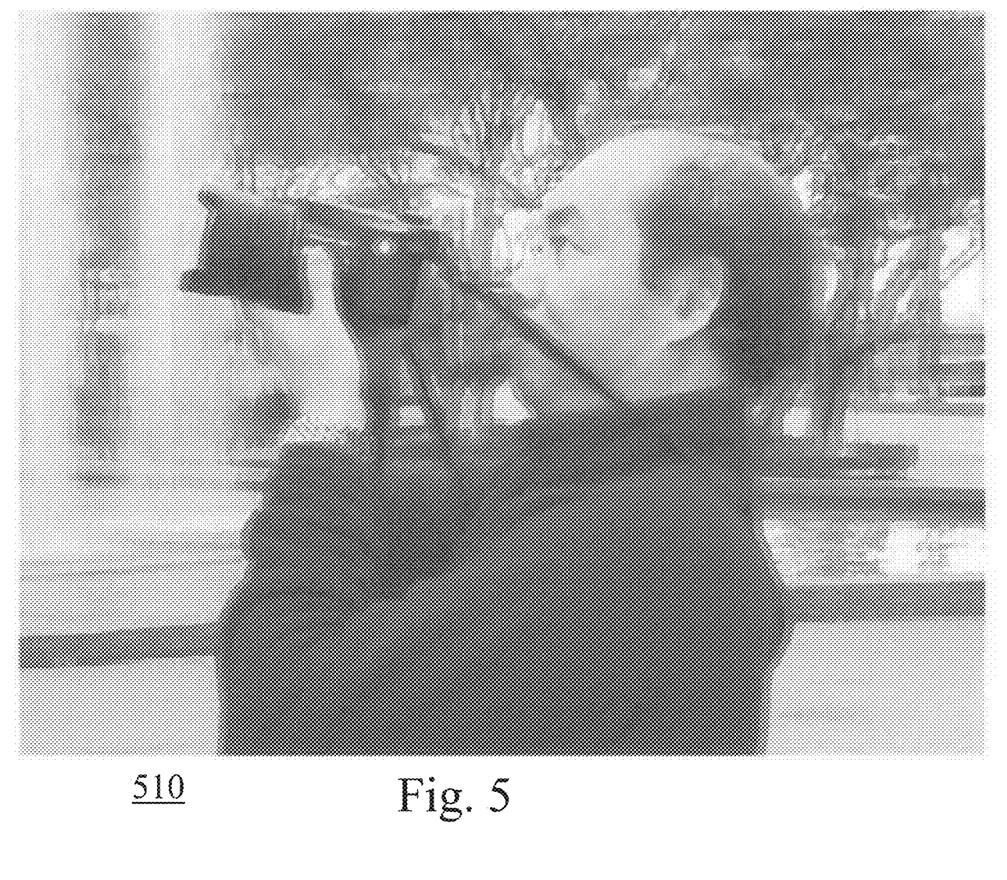
FIG. 5 illustrates an exemplary visual output based upon the plenoptic image and an additional exemplary processing technique.

Controls may be provided for the user to change the distance between viewpoints. A default of 8 microimages is a reasonable starting point for most images, however, the value may change depending upon the depth of the original image. With continuing reference to FIG. 4, visual output 440 illustrates an exemplary anaglyph rendering of plenoptic image 410. With reference to FIG. 5 there is illustrated another anaglyph rendering 510 of a different test image.

Certain exemplary rendering techniques allow the viewpoint of an anaglyph rendered visual output to be changed based upon the head position of a viewer which may be evaluated, for example, using the aforementioned head tracking operations. A control may be provided that allows an adaptive viewer to be selected by a user based upon his or her head position updated constantly so that as head moves around so does the rendered image creating the illusion of looking around at a three-dimensional scene. The adapted view may also be utilized with stereoscopic rendering so that the scene can be viewed stereoscopically with an added layer of looking around with head movement. This double layered three-dimensional view opens up a world of possibilities in accurately recreating a scene visually. It should be noted that depending upon the evaluation of the position of the viewer the image which is selected may vary and the display image will appear differently to the user, for example, to emulate the effect of changes in viewer perspective relative to an image being displayed.

Figure 2:
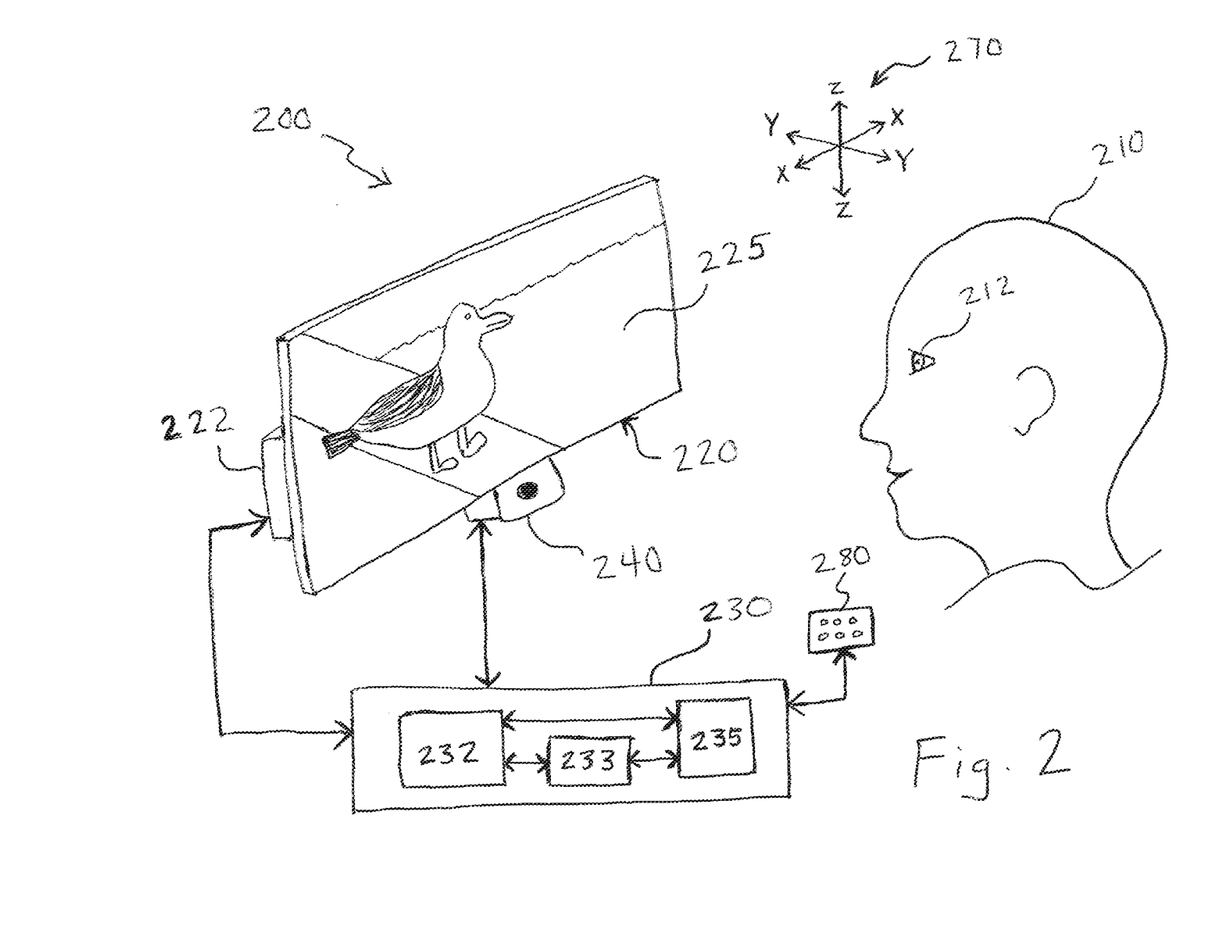
FIG. 2 illustrates an exemplary system for processing, rendering and displaying a visual output based upon a plenoptic image.

With reference to FIG. 2 there is illustrated an exemplary plenoptic image processing and display system 200 which comprises a processing unit 230, a display 220 coupled with the processing unit 230, a camera 240 coupled with the processing unit 230, and a user input 280 coupled with the processing unit 230. System 200 may be provided in a variety of applications including, for example, video and multimedia entertainment systems, video and multimedia gaming systems, video and multimedia devices, computerized picture frames, and photographic, video and multimedia editing and production systems to name but a few examples.

System 200 is designed to be used by a viewer 210 whose position may vary relative to the x, y, and/or z axes illustrated in legend 270 including translation and rotation relative to one or more of the x, y, and/or z axes. Camera 240 is configured to digitally capture images of viewer 210 and provide the images to processing unit 230. In the illustrated embodiment camera 240 is also configured to receive commands from processing unit 230 such as focus, zoom, direction, and image capture commands. In other embodiments camera 240 may be in one-way communication with processing unit 230 and may receive the aforementioned commands from an on-board or external controller (not illustrated). The controller may be configured in one way or two way communication with processing unit 230 or may be provided in a stand alone configuration without communication with processing unit 230.

Processing unit 230 comprises image processing module 232, memory module 233, and system processing module 235. Image processing module 232 is configured to perform image processing and rendering operations such as those described herein. System processing module is configured to manage additional system functionalities such as power management and input/output operation among others. It shall be appreciated that the modules may be distinct elements or aspects of a common element. For example, in one embodiment, the processing unit 230 is a computer such as a desktop, laptop or tale machine comprising one or more microprocessors configured to implement image processing module 233 and system processing module 235. In some forms the computer may comprise a CPU and a dedicated graphics processor, however, a variety of configurations are contemplated. It shall be appreciated that these and other modules or operations described herein may be implement in software, hardware, firmware or combinations thereof.

User input 280 may comprise any of a number of types of devices, including a keyboard, mouse, track pad, video game controller, or combinations of these and/or other viewer manipulatable input devices. User input 280 may operate in combination with processing unit 230 to allow a viewer or other user to perform a variety of control functions, including: loading, saving, clearing and deleting images, adjusting the number of microimages of a plenoptic image in x and y dimensions, adjusting microimage size in x and y dimensions, adjusting viewpoint in x and y dimensions, and setting rendering modes, e.g., constant rendering or at will rendering.

Figure 6:
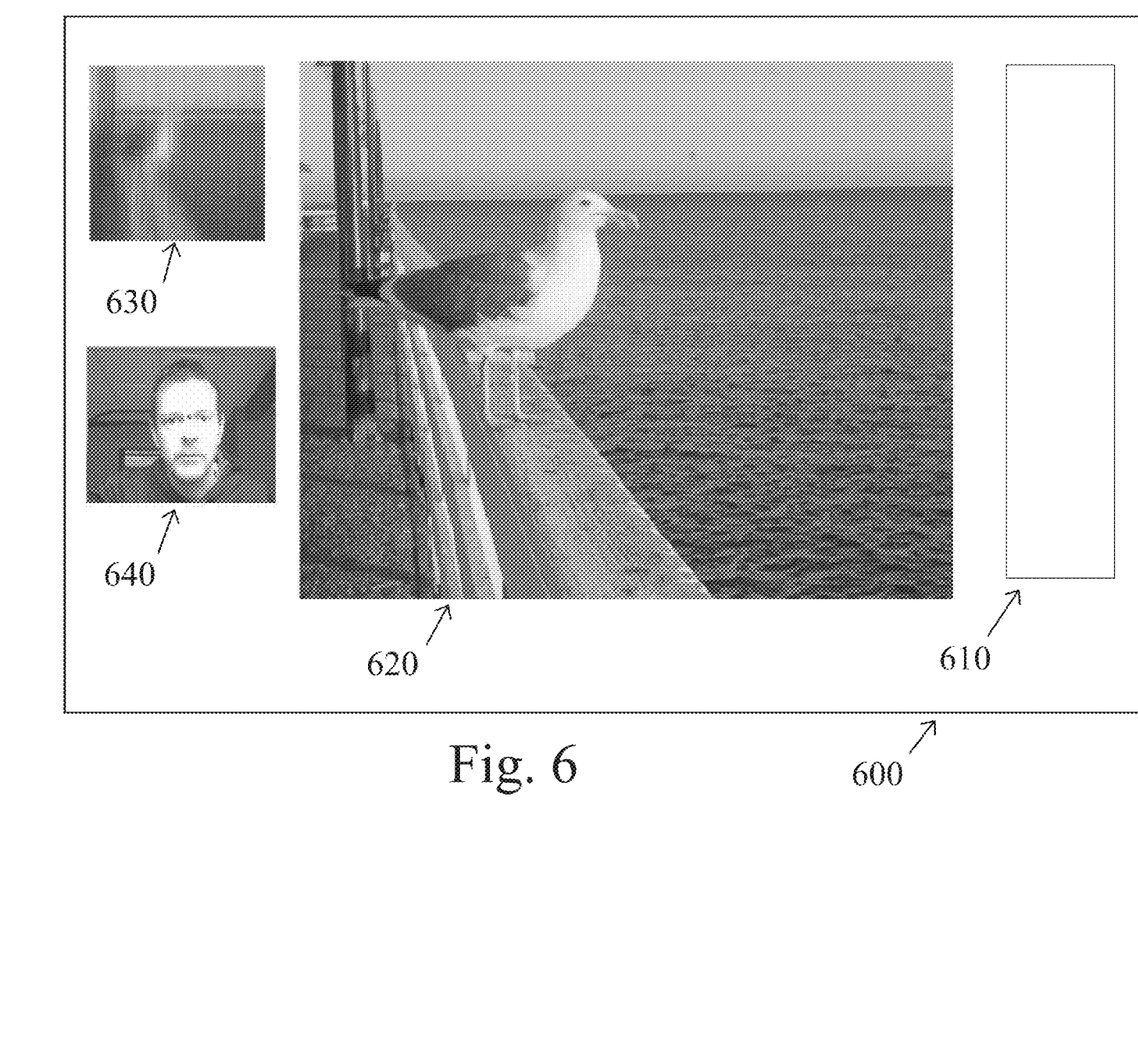
FIG. 6 illustrates an exemplary user interface displaying visual output based upon the plenoptic image.

With reference to FIG. 6 there is illustrated an exemplary user interface display 600 which may be provided in the system 200 or other exemplary systems, and may utilize one or more techniques of process 100 or other exemplary processes. User interface display 600 includes a toolbar 610 which may be manipulated based upon user input, and a visual output window 620 which may display rendered images based upon a plenoptic image. Toolbar 610 may include a variety of controls which can be manipulated by a user through a graphical user interface input device. The controls may include, for example, settings for the number of microlenses in the x and y directions, settings for the x and y dimensions of the microlenses, settings for the number of microlenses in the x and y directions, settings for the x and y coordinates of the viewpoint or viewing position, stereoscopic 3D controls such as an enable 3D control and a separation setting, a blending or smoothing control, a small image default control, a full image default control, a render control, a continuous render control, a load picture control a save picture control a show original control, a clear picture control, a face tracking control and/or an enable adaptive view control. User interface display 600 further comprises a plenoptic image window 630 which displays the plenoptic image upon which the visual output is based or a processed version of that image, and a viewer image window which displays the image of the viewer being tracked.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
    a processing unit having a microprocessor coupled to a non-transitory computer readable memory configured to store at least one plenoptic image;
    a display device coupled with the processing unit and configured to display visual output based upon output from the processing unit;
    an input device configured to provide viewing position information to the processing unit;
    wherein the microprocessor of the processing unit is configured to execute computer-readable instructions to:
    perform a blending or smoothing function on information of the plenoptic image including weighting each of a plurality of pixels of the plenoptic image based upon its color, adjusting the weighting of each of the plurality of pixels based upon color information of a plurality of neighboring pixels and a number of the plurality of neighboring pixels;
    render visual output information based upon information of the plenoptic image and the viewing position information; and
    provide the visual output information to the display device, the visual output information varying as a function of the viewing position information.

2. A system according to claim 1 wherein the visual output comprises a three-dimensional component.

3. A system according to claim 2 wherein the three dimensional component comprises an image rendered for output on a stereoscopic display.

4. A system according to claim 2 wherein the three dimensional component comprises an anaglyph image.

5. A system according to claim 4 wherein the anaglyph is generated according to the following acts: (a) creating a left-eye viewpoint rendering and a right-eye viewpoint rendering, and (b) for each pixel in the rendered image assign to left frame or right frame for stereoscopic output.

6. A system according to claim 1 wherein the blending or smoothing function is performed for each pixel within a fixed distance from an edge of each patch within a microimage.

7. A system according to claim 1 wherein the blending or smoothing function comprises, for each pixel N within a fixed distance from an edge of each patch within a microimage of the plenoptic image:
    a) weighting the pixel N at a fixed amount to favor its original color;
    b) for each pixel neighboring the pixel N in each direction including diagonals determining the color of the pixel on the adjacent side/corner at an appropriate distance inside the patch, and adding that color to the original color;
    c) when all pixels neighboring the pixel N have been evaluated, divide the total color by the number of pixels used for blending, including the weighted amount from the original to determine a new color; and
    d) changing the color of pixel N to the new color.

8. A system according to claim 1 wherein the input device comprises a camera coupled with the processing unit and configured to capture an image of a viewer positioned to view the display device, and wherein processing unit is configured to process the image of the viewer to determine the viewing position information.

9. A system according to claim 1 where in the viewing position information is determined in accordance with the following operations:
a) capturing an image of a viewer from a camera;
b) modifying the image qualities to improve detection of the image;
c) searching for a face in the image using xml cascade;
d) calculating the position of the face in x, y coordinates;
e) updating viewing position based upon the x, y coordinates;
f) locating a point between the viewer's eyes; and
g) updating the image in a live view on the display.

10. A system according to claim 1 wherein the viewing position information is based upon commands received from a user.

11. A system according to claim 9 wherein the input device comprises a graphical user interface input control presented on the display device.

12. A method comprising:
storing a plenoptic image in a non-transitory computer readable memory in operative communication with a processor;
receiving at the processor a viewing position information;
processing the plenoptic image and the viewing position information to render a visual output based upon information of the plenoptic image and the viewing position information;
performing a blending or smoothing function on information of the plenoptic image including weighting each of a plurality of pixels of the plenoptic image based upon a first color value associated with each pixel and a set of second color values associated with a plurality of neighboring pixels; and
displaying the visual output on a display device;
wherein the visual output displayed on the display device varies as a function of the viewing position information.

13. A method according to claim 12 wherein the visual output comprises a three-dimensional component.

14. A method according to claim 12 wherein the three dimensional component comprises an anaglyph image.

15. A method according to claim 14 wherein the anaglyph is generated by:
(a) creating a left-eye viewpoint rendering and a right-eye viewpoint rendering, and
(b) for each pixel in the rendered image take the red value of the pixel color from the left-eye image, and change the red value of the right-eye image to that value.

16. A method according to claim 12 wherein the blending or smoothing function is further passed upon a total number of neighboring pixels for each pixel subject to the blending or smoothing function.

17. A method according to claim 12 wherein the blending or smoothing function comprises, for each pixel N within a fixed distance from an edge of each patch with a microimage:
weighting the pixel N at a fixed amount to favor its original color; for each pixel neighboring the pixel N in each direction including diagonals determining the color of the pixel on the adjacent side/corner at an appropriate distance inside the patch, and adding that color to the original color; when all pixels neighboring the pixel N have been evaluated, divide the total color by the number of pixels used for blending, including the weighted amount from the original to determine a new color; and changing the color of pixel N to the new color.

18. A method according to claim 12 wherein the viewing position information is generated and processed by:
capturing an image of a viewer from a camera;
modifying the image qualities to improve detection;
searching for a face using xml cascade;
calculating the position of the face in x, y coordinates;
updating the viewpoint for the rendering routine with the x, y coordinates;
locating a point between the viewer's eyes; and
updating the image in the live view on the display.

19. A method according to claim 12 wherein the viewing position information is generated based upon a command input by a user.

20. A method according to claim 19 wherein the command is input by the user via a graphical user interface.

* * * * *